(12) United States Patent
Nüchter et al.

(10) Patent No.: US 9,248,876 B2
(45) Date of Patent: Feb. 2, 2016

(54) OMNIDIRECTIONAL VEHICLE, DRIVING MODULE, AND MOBILE INDUSTRIAL ROBOT

(75) Inventors: Elmar Nüchter, Augsburg (DE); Edmund Bahr, Kissing (DE); Heinrich Lohmüller, Augsburg (DE)

(73) Assignee: Kuka Roboter GmbH, Augsburg (DE)

( * ) Notice: Subject to any disclaimer, the term of this patent is extended or adjusted under 35 U.S.C. 154(b) by 1062 days.

(21) Appl. No.: 12/594,623

(22) PCT Filed: Mar. 31, 2008

(86) PCT No.: PCT/EP2008/053819
§ 371 (c)(1),
(2), (4) Date: Apr. 21, 2010

(87) PCT Pub. No.: WO2008/122538
PCT Pub. Date: Oct. 16, 2008

(65) Prior Publication Data
US 2010/0224427 A1  Sep. 9, 2010

(30) Foreign Application Priority Data
Apr. 4, 2007 (DE) .......... 10 2007 016 662

(51) Int. Cl.
*B62D 57/00* (2006.01)
*B62D 61/10* (2006.01)
*B25J 5/00* (2006.01)
*B60B 19/00* (2006.01)
*B60B 19/12* (2006.01)
(Continued)

(52) U.S. Cl.
CPC ................ *B62D 61/10* (2013.01); *B25J 5/007* (2013.01); *B60B 19/003* (2013.01); *B60B 19/125* (2013.01); *B60G 3/01* (2013.01); *B62D 57/024* (2013.01); *B62D 61/12* (2013.01); *B60B 2310/311* (2013.01); *B60B 2900/131* (2013.01); *B60G 2300/36* (2013.01); *B60Y 2200/40* (2013.01)

(58) Field of Classification Search
CPC ....... B25J 5/007; B62D 61/10; B62D 57/024; B62D 61/12; B60B 19/003; B60B 19/125; B60G 3/01
USPC ........ 180/7.1, 7.2; 301/1, 5.1, 5.23, 9.2, 40.6, 301/45, 46, 50, 52, 43; 16/29, 30, 40; 440/12.68, 12.69; 416/145, 205
See application file for complete search history.

(56) References Cited

U.S. PATENT DOCUMENTS 3,756,619 A * 9/1973 Thorsell ...................... 280/104
3,876,255 A 4/1975 Hon
(Continued)

FOREIGN PATENT DOCUMENTS

DE          37 33 695 A1      4/1989
DE    20 2004 015 422 U1      1/2005
(Continued)

*Primary Examiner* — Joseph Rocca
*Assistant Examiner* — Jacob Knutson
(74) *Attorney, Agent, or Firm* — Schiff Hardin LLP

(57) ABSTRACT

An omnidirectional vehicle has a driving module and a mobile industrial robot. The omnidirectional vehicle has omnidirectional wheels and a vehicle body, on which at least one of the omnidirectional wheels is mounted by means of an individual suspension.

14 Claims, 11 Drawing Sheets

(51) Int. Cl.
*B60G 3/01* (2006.01)
*B62D 57/024* (2006.01)
*B62D 61/12* (2006.01)

(56) References Cited

U.S. PATENT DOCUMENTS

| | | | |
|---|---|---|---|
| 4,335,899 A * | 6/1982 | Hiscock | 280/259 |
| 4,621,562 A * | 11/1986 | Carr et al. | 89/41.05 |
| 4,948,167 A * | 8/1990 | Kopczynski | 180/24.09 |
| 5,323,867 A * | 6/1994 | Griffin et al. | 180/22 |
| 5,848,658 A * | 12/1998 | Pulver | 180/65.1 |
| 5,961,106 A * | 10/1999 | Shaffer | 267/221 |
| 6,796,618 B2 * | 9/2004 | Harris | 301/5.1 |
| 2003/0127259 A1 * | 7/2003 | Logstrup | 180/23 |
| 2003/0183427 A1 | 10/2003 | Tojo et al. | |
| 2006/0185911 A1 * | 8/2006 | Gunderson et al. | 180/8.3 |
| 2008/0156616 A1 * | 7/2008 | Chu et al. | 198/345.3 |

FOREIGN PATENT DOCUMENTS

| | | |
|---|---|---|
| FR | 2 701 429 | 8/1994 |
| JP | 60107464 A | 6/1985 |
| WO | WO 01/53137 A1 | 7/2001 |

* cited by examiner

OMNIDIRECTIONAL VEHICLE, DRIVING MODULE, AND MOBILE INDUSTRIAL ROBOT

BACKGROUND OF THE INVENTION

1. Field of the Invention

The invention concerns an omnidirectional vehicle, a driving module and a mobile industrial robot.

2. Description of the Prior Art

An example of an omnidirectional wheel or omniwheel is a Mecanum wheel that, for example, is known from U.S. Pat. No. 3,876,255. An omnidirectional wheel can move in any direction and generally possesses rollers whose surfaces are fashioned like spheres or barrels and whose roller axles are mounted at an angle, for the most part at an angle of 45° relative to the axis of the wheel.

DE 20 2004 015 422 U1 discloses an omnidirectional vehicle with Mecanum wheels that, for example, is used for working on the airfield apron. However, conventional omnidirectional vehicles can move with only a relatively low speed of, for instance, up to 6 km/h. Furthermore, the Mecanum wheels in conventional omnidirectional vehicles are rigidly attached to the vehicle, which can lead to a relatively poor driving behavior given an uneven ground, for example.

SUMMARY OF THE INVENTION

It is therefore the object of the present invention to specify a more flexible omnidirectional vehicle.

The object of the invention is achieved by an omnidirectional vehicle having a vehicle body and multiple omnidirectional wheels arranged such that they can rotate on the vehicle body, of which at least one of the omnidirectional wheels is arranged on the vehicle body by means of a single wheel suspension.

In particular, all omnidirectional wheels can be arranged on the vehicle body by means of a single wheel suspension.

An omnidirectional wheel normally possesses a rim that is borne such that it can rotate, on which rim multiple rollers are borne such that they can rotate without being driven. The rim can be driven with an actuator, for example an electrical or hydraulic actuator. An example of an omnidirectional wheel is the Mecanum wheel as it is known from U.S. Pat. No. 3,876,255.

The vehicle according to the invention in particular possesses at least four omnidirectional wheels that are respectively arranged on the vehicle body by means of a single wheel suspension.

The single wheel suspensions with which the omnidirectional wheels (or also wheel pairs) are suspended have the effect that the floor contact of the individual omnidirectional wheels is improved in comparison to rigidly suspended omnidirectional wheels as this is the case in conventional omnidirectional vehicles. The danger that one of the omnidirectional wheels loses contact with the floor is thereby at least reduced, whereby all wheels of the omnidirectional vehicle remain loaded. The danger of an overloading of the vehicle according to the invention can thereby be reduced if not entirely prevented. An improved, on-track driving behavior of the vehicle according to the invention can result via the improved floor wheel grip.

The single wheel suspension can possess a damping that at least partially cushions the corresponding omnidirectional wheel in the operation of the vehicle according to the invention. This can lead to a shake-free operation.

According to one variant of the vehicle according to the invention, the single wheel suspension can be executed such that the corresponding omnidirectional wheel can be adjusted in terms of its height. A more slanted or buckled floor on which the vehicle according to the invention drives or stands can be at least partially compensated via the height adjustment capability, for example. It is also possible to align a loading area of the vehicle according to the invention not just level but also specifically angled, for example in the driving direction or transversal to the driving direction.

According to embodiments of the vehicle according to the invention, its single wheel suspension is executed such that it can retract its omnidirectional wheel into the vehicle body and can extend its omnidirectional wheel at least partially out from the vehicle body, and/or that its single wheel suspension has a lifting device and/or a reversing lever. The height regulation of the wheel can be carried out in a relatively simple manner via these measures. Cylinders, spindles or reversing levers can be used as a lifting device, for example.

The single wheel suspension is, for example, a linearly directed unit or a rocker.

An automatic level regulation can in particular be executed relatively simply when, according to one variant of the vehicle according to the invention, this possesses at least one clearance sensor with whose help the height of the omnidirectional wheel can be adjusted. For example, this clearance sensor measures the ground clearance from the vehicle according to the invention and automatically regulates the height of the individual wheels. For example, it is thereby possible that the vehicle according to the invention can cross obstacles, for example a step.

The single wheel suspension can in particular possess a vibration damper. These are relatively simple to produce and additionally have a damping property for the wheel. The vibration damper can, for example, be a pipe damper or a damping cylinder.

Some or all omnidirectional wheels of the vehicle according to the invention can be driven by corresponding actuators and/or braked by brakes. The actuators are, for example, electrical or hydraulic actuators and in particular drive the rims of the omnidirectional wheels.

According to a further embodiment of the vehicle according to the invention, this additionally possesses at least one standard wheel that is arranged such that it can rotate by means of a single wheel suspension at the vehicle body. A standard wheel does not have any omnidirectional property and can, for example, be a solid rubber wheel.

According to a variant of the vehicle according to the invention, the single wheel suspension of the standard wheel is executed essentially like the single wheel suspension of the omnidirectional wheel. For example, it is thus possible to operate the vehicle according to the invention in a first operating mode in which the omnidirectional wheels are retracted or at least raised, and only the standard wheels have contact with the floor. In this operating mode, the vehicle according to this variant according to the invention can then drive relatively quickly. In a second operating mode, the omnidirectional wheels are then extended and the standard wheels are retracted or at least raised so that the standard wheels no longer have contact with the floor and the vehicle according to the invention has its omnidirectional property.

The vehicle according to the invention can have multiple standard wheels with a single wheel suspension, of which at least one is executed such that it is steerable and/or at least one is associated with an actuator to drive the standard wheel. According to this variant of the vehicle according to the invention, this is also steerable and/or automatically drivable in its first operating mode. It is thereby possible to move this variant of the vehicle according to the invention relatively quickly from one site to the next in the first operating mode and to use it at the usage site as an omnidirectional vehicle. A crossing by the vehicle according to the invention on uneven ground is also at least facilitated by the single wheel suspension. The actuator for the standard wheel is, for example, an electrical or hydraulic actuator.

According to a further variant of the vehicle according to the invention, the vehicle body thereof has multiple first driving modules that each have:
- a first module body,
- the omnidirectional wheel and
- the single wheel suspension that is arranged on the first module body.

Due to these variants, omnidirectional vehicles of different sizes can be assembled from the single first driving modules. For example, the maximum payload of the individual omnidirectional wheels can be taken into account upon assembly. At least four such driving modules are normally required in order to achieve an omnidirectional vehicle.

At least one of the first module bodies can possess an actuator for actuation and/or a brake for braking of its omnidirectional wheel. This actuator is, for example, an electrical or a hydraulic actuator.

The first driving modules can be assembled so as to be separable or inseparable. The separable variant is more flexible under the circumstances.

According to a further embodiment of the vehicle according to the invention, its vehicle body has multiple second driving modules that each have:
- a second module body,
- the standard wheel and
- the single wheel suspension that is arranged on the second module body.

The second module body can in particular be executed essentially identical in construction to the first module bodies. By means of the second driving modules, a vehicle can be assembled that can be operated in the two operating modules described in the preceding.

At least one of the second module bodies can possess an actuator for actuation and/or a brake to brake its standard wheel.

The first and second driving modules can be assembled so as to be separable or inseparable and/or at least one of the second driving modules can be executed such that its standard wheel is steerable.

In a further aspect of the present invention, an omnidirectional driving module is provided that has:
- an omnidirectional wheel with a single wheel suspension,
- a module body to which the omnidirectional wheel is attached by means of the single wheel suspension,
- an actuator to drive the omnidirectional wheel and
- a coupling element that connects the driving module with additional omnidirectional driving modules.

With multiple of these driving modules according to the invention, the omnidirectional vehicle according to the invention can be assembled. The coupling element can be, for example one or more bolts, pins or rivets and can be executed so as to be separable or inseparable if an omnidirectional vehicle has been assembled from multiple driving modules. The actuator is, for example, an electrical or hydraulic actuator.

According to embodiments of the driving module according to the invention, its single wheel suspension has a damping to damp the omnidirectional wheel or a brake to brake the omnidirectional wheel and/or has a lifting device and/or a reversing lever.

According to variants of the driving module according to the invention, its single wheel suspension is executed such that the omnidirectional wheel can be adjusted in terms of its height, and/or that the omnidirectional wheel can retract into the module body and be extended at least partially from the module body.

The driving module according to the invention can have at least one clearance sensor with which the height of the omnidirectional wheel can be adjusted, in particular for a level regulation.

The individual wheel suspension can have a vibration damper that, for example, is executed in a cylindrical shape.

In a further aspect of the invention, a device is provided having:
- an industrial robot that has multiple robotic axles and a control computer to control the robotic axles, and
- an omnidirectional bearing vehicle that has omnidirectional wheels and actuators to move the omnidirectional wheels, wherein the control computer additionally also controls the actuators to move the omnidirectional wheels.

The bearing vehicle can in particular be an omnidirectional vehicle according to the invention as described in the preceding.

The device according to the invention thus possesses an industrial robot that can be moved by means of the omnidirectional transport vehicle. The industrial robot has multiple robotic axles that are moved in a generally known manner by the control computer. For this the industrial robot possesses generally known actuators, for example.

In addition, this control computer also activates the actuators of the omnidirectional transport vehicle, so the combination of industrial robot and transport vehicle is controlled by the control computer of the industrial robot. Only one controller is thereby used.

The actuators for the wheels can be provided as auxiliary axles in the control program of the control computer. For example, if the industrial robot has six robotic axles, in the control program an additional axis can then be respectively associated with the individual actuators for the wheels. This allows a simultaneous movement of the industrial robot with the bearing vehicle, calibrated to one another.

Furthermore, an integrated path measurement system of the robotic axles can be applied for freely programmable position variation of the industrial robot in a large-area usage regions.

Position deviations of the complete device can be compensated both by the industrial robot and by the bearing vehicle.

DESCRIPTION OF THE PREFERRED EMBODIMENTS

Figure 1:
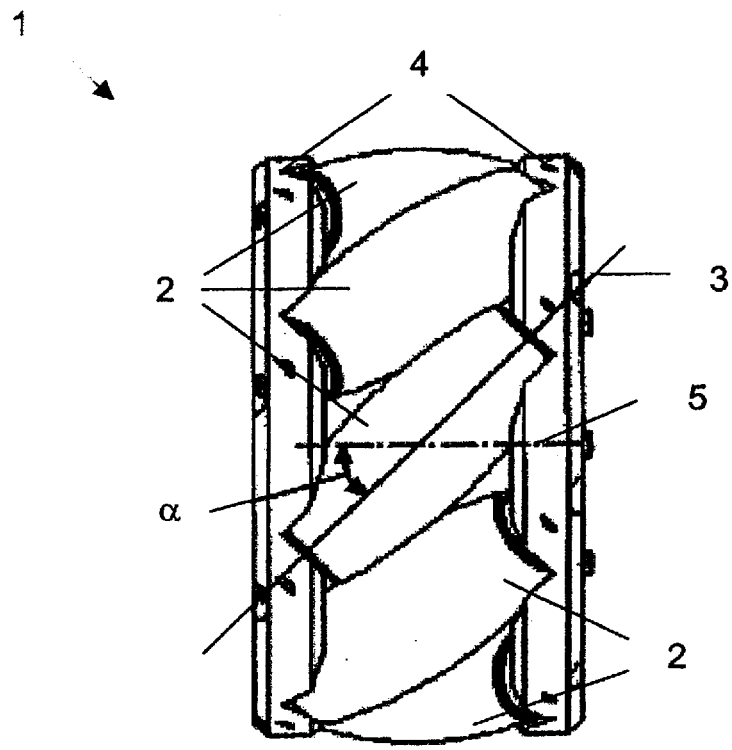
FIG. 1 shows an omnidirectional wheel of the type used in accordance with the present invention.

FIG. 1 shows a front view of a Mecanum wheel 1 essentially known to those skilled in the art as an example of an omnidirectional wheel. The wheel 1 has two wheel disks 4 rigidly connected with one another, between which multiple rollers 2 are borne such that they can rotate relative to their longitudinal axes 3. The two wheel disks 4 can be borne such that they can rotate relative to a rotation axis 5 and are driven by means of an actuator (not shown in detail in FIG. 1) such that the two wheel discs rotate relative to the rotation axis 5.

In the shown exemplary embodiment, the rollers 2 are spaced uniformly from one another and are born on the wheel discs 4 such that their roller surfaces project beyond the circumference of the wheel discs 4. Moreover, the rollers 2 are borne on the wheel discs 4 such that their longitudinal axes 3 possess an angle α of, for example, 45° with the rotation axis 5.

Figure 2:
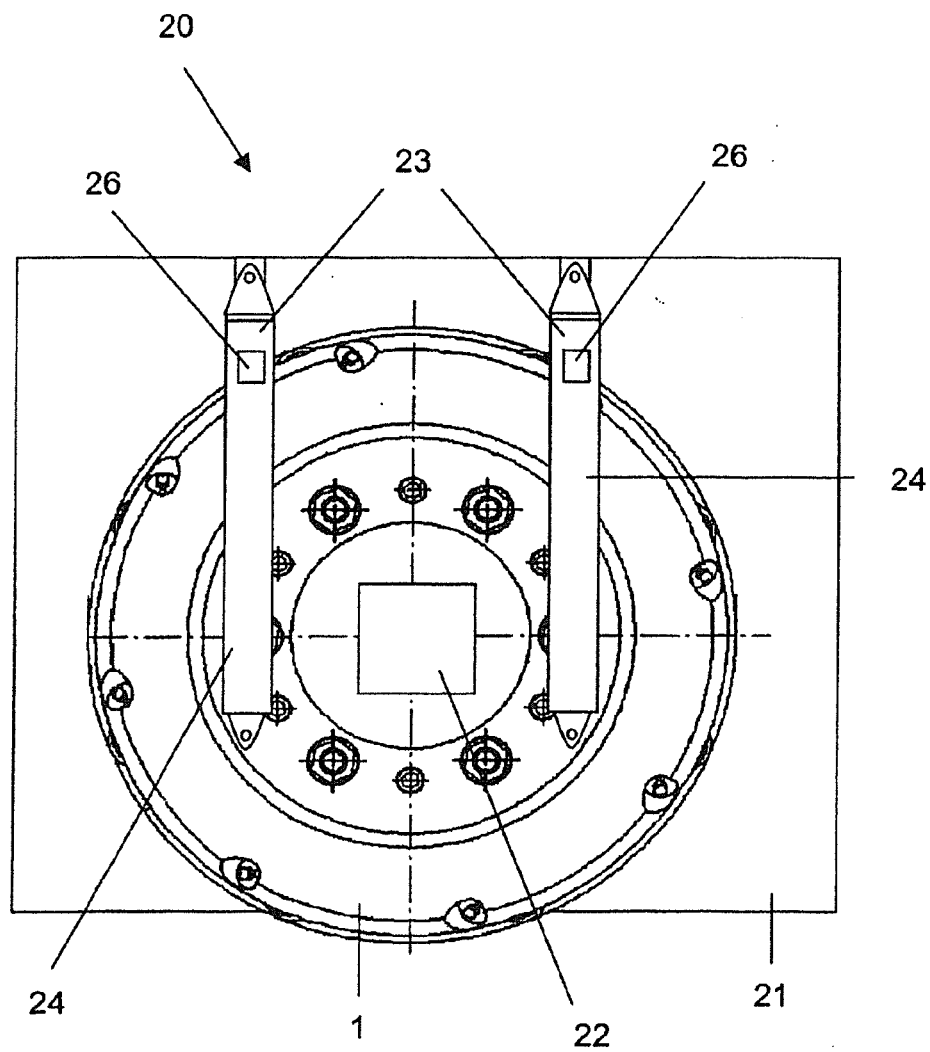
FIGS. 2 and 3 show a driving module with an omnidirectional wheel in accordance with the invention, respectively in two different operating states.
Figure 3:
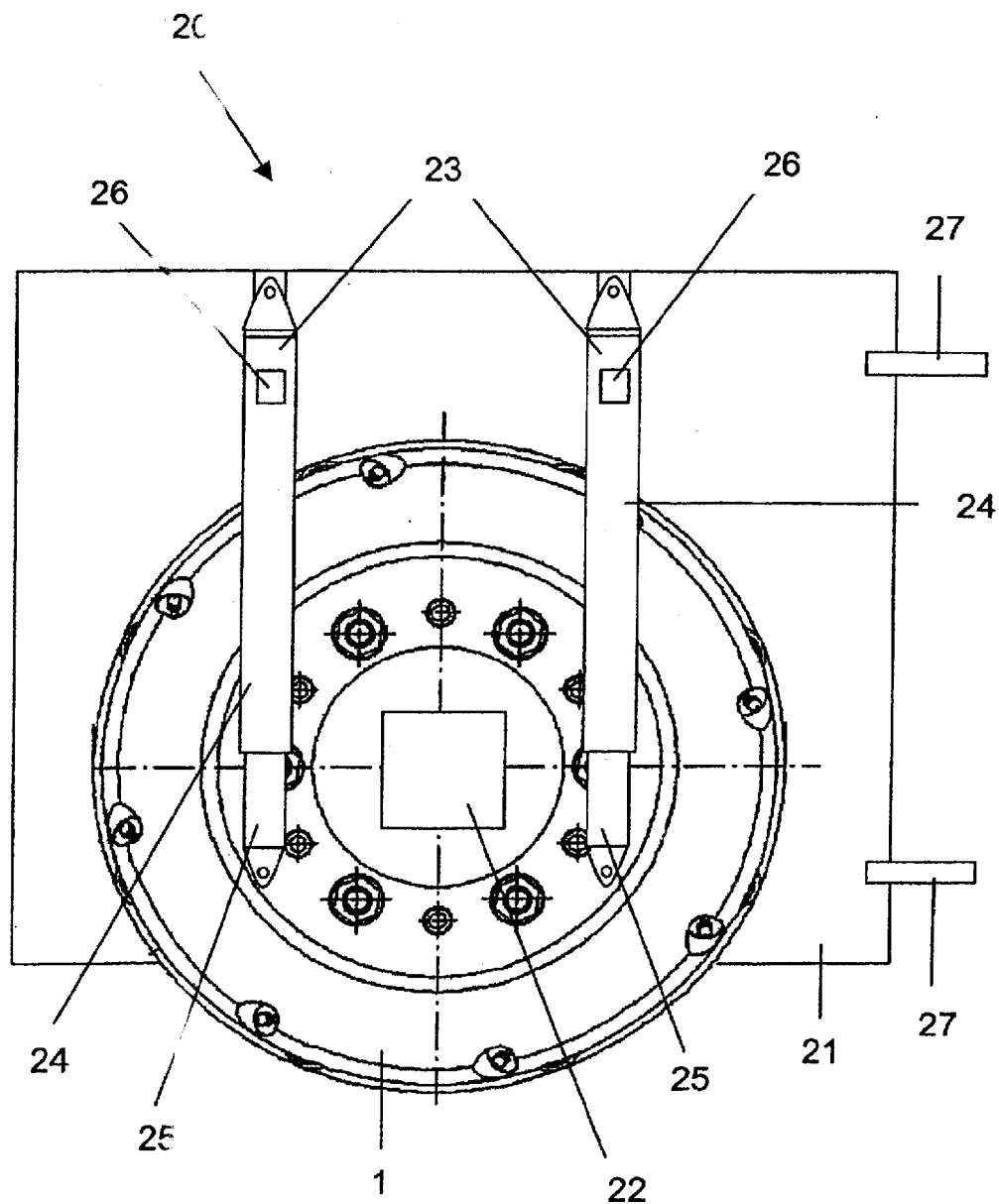

FIGS. 2 and 3 show an omnidirectional driving module 20 with a module body 21 and the Mecanum wheel 1 shown in FIG. 1 as an example of an omnidirectional wheel. The wheel 1 is shown in a side view in FIGS. 2 and 3.

The wheel 1 is attached to the module body 21 by means of a single wheel suspension. The single wheel suspension for the wheel 1 is executed such that the wheel 1 can rotate along its rotation axis 5 and, in the case of the present exemplary embodiment, can be driven by an actuator 22. The actuator 22 has an electrical motor (for example in a generally known manner) that can be controlled and supplied with electrical energy via electrical conductors (not shown in detail in Figures). Alternatively, a hydraulic actuator in particular can be used.

Figure 2A:
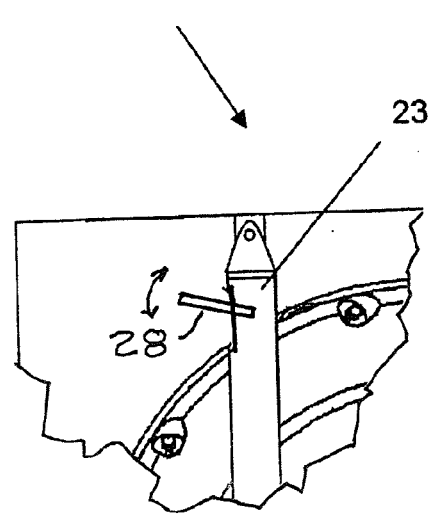
FIG. 2A shows a driving module with an omnidirectional wheel in accordance with the invention, in an embodiment using a lever to extend and retract the omnidirectional wheel.

In the case of the present exemplary embodiment, the single wheel suspension for the wheel 1 has two vibration dampers 23 that each has an outer tube 24 and an inner tube 25. The inner tube 25 is arranged in the outer tube 24 and, in the case of the present exemplary embodiment, be extended by a predetermined distance. FIG. 2 shows the vibration damper in its retracted state and FIG. 3 shows the vibration damper 23 in its extended state. The inner tube 23 can, for example, be extended and retracted by means of (for example) linear actuators 26 as this is shown in FIGS. 2 and 3, or can also be brought to intermediate positions. Alternatively, as shown in FIG. 2A, a lever 28 can be provided that is movable to extend and retract the inner tune 23.

One of the ends of each of the outer tubes 24 is attached to the module body 21. The ends of the inner tube 25 that are facing away from these ends of the outer tube 24 are attached to the wheel 1 so that this is on the one hand attached such that it can rotate at the module body 21, and so that it can be at least partially retracted into the module body 21 (as is shown in FIG. 2) and be partially extended from the module body 20 (as shown in FIG. 3) due to the possibility to retract the inner tube 25 into and extend the inner tube 25 from the module body 21.

Figure 4:
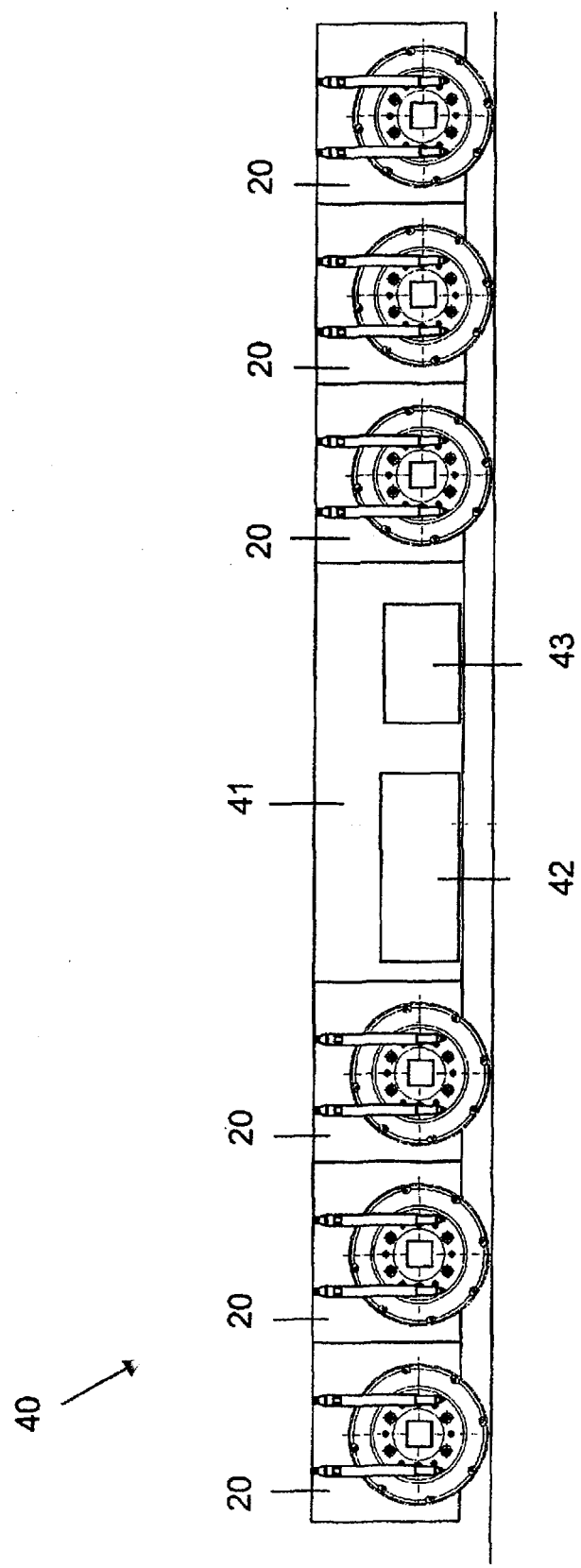
FIGS. 4 through 6 schematically illustrate an omnidirectional vehicle in accordance with the present invention.
Figure 5:
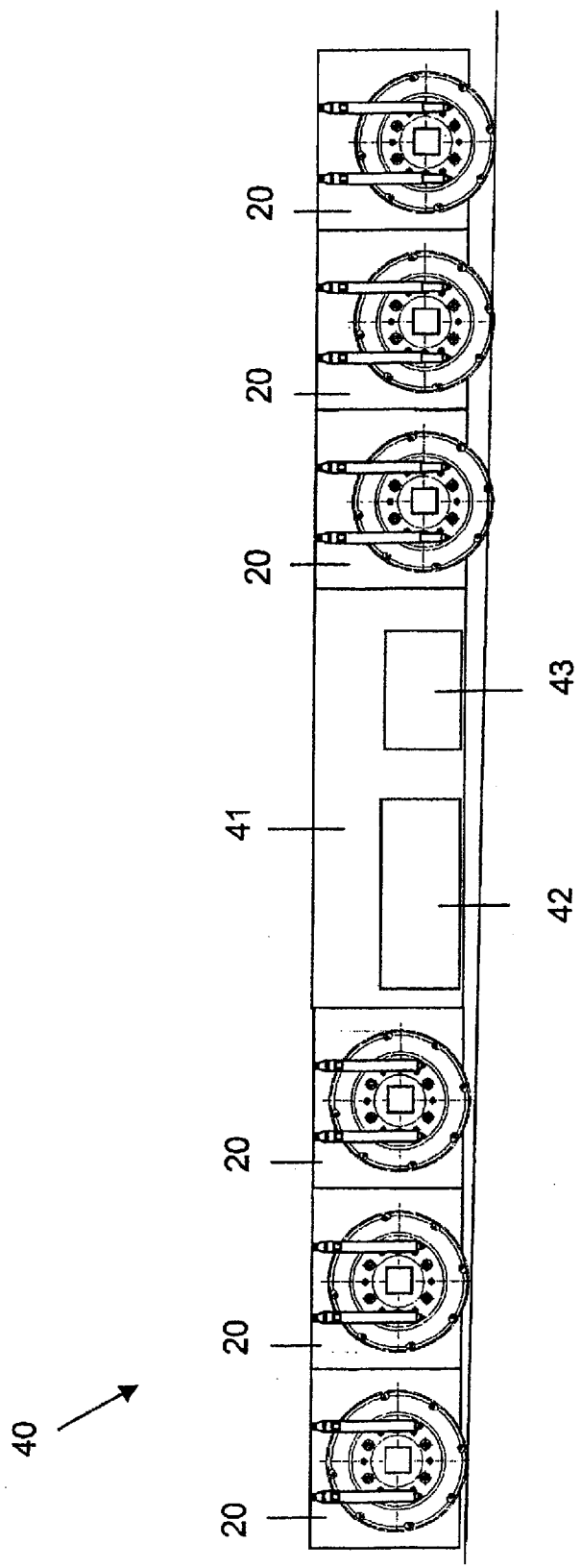
Figure 6:
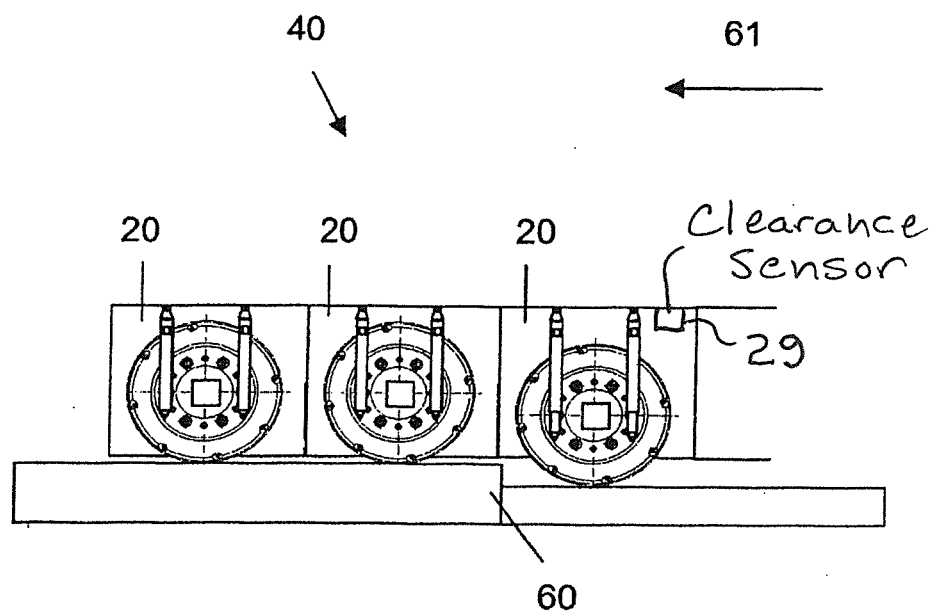

FIGS. 4 through 6 show a side view of an omnidirectional vehicle 40 that has at least four (in the case of the present exemplary embodiment, twelve) driving modules 20. So that the driving modules 20 can be assembled into a vehicle 40, each has a coupling element by which the driving modules 20 can be assembled. In the case of the present exemplary embodiment, the individual driving modules 20 are bolted to one another by bolts 27 and thus also can be taken apart from one another. It is thus possible to assemble omnidirectional vehicles of different sizes from the individual driving modules 20.

In the exemplary embodiment, the vehicle 40 also has a bearing module 41 that was bolted to the driving modules 20. The top sides of the driving modules 20 and of the bearing module 41 yield a loading area on which, for example, articles can be transported (not shown in detail).

In the exemplary embodiment, a battery 42 and a control device 43 are arranged in the bearing module 41. The battery 42 is connected (in a manner that is not shown) with the actuators 22 of the wheels 1 and with the linear actuators 26 of the vibration dampers 23 in order to supply these with electrical power. The control device 43 is likewise connected (in a manner that is not shown) with the actuators 22 of the wheels 1 and with the linear actuators 26 of the vibration dampers 23 in order to control these. The control device 43 is, among other things, configured to individually activate the linear actuators 26 of the driving modules 20 such that their wheels 1 can be individually retracted and extended.

In FIG. 4, all driving modules 20 of the vehicle 40 are shown in an operating state in which all wheels 1 are extended, and in FIG. 5 the wheels 1 of the driving modules 20 shown on the left side of the drawing are shown retracted and the wheels 1 shown on the right side of the driving modules 20 are shown extendepd. For example, it is thus possible that the loading area of the vehicle 40 is tilted, or that the loading area can be aligned horizontally even given an uneven or slanted ground on which the vehicle 40 drives or stands.

By the individual retraction and extension of the wheels 1 of the vehicle 4 in response to a signal from a clearance sensor 29 that is shown in FIG. 6, it is possible, for example, for the vehicle 40 to drive over a step 60 without the loading area tilting, as is shown in FIG. 6. For example, if the vehicle 40 drives over the step 60 in the direction of an arrow 61, the wheels 1 of the individual driving modules 20 are then retracted step-by-step in succession until the vehicle 40 has surmounted the step 60.

Figure 7:
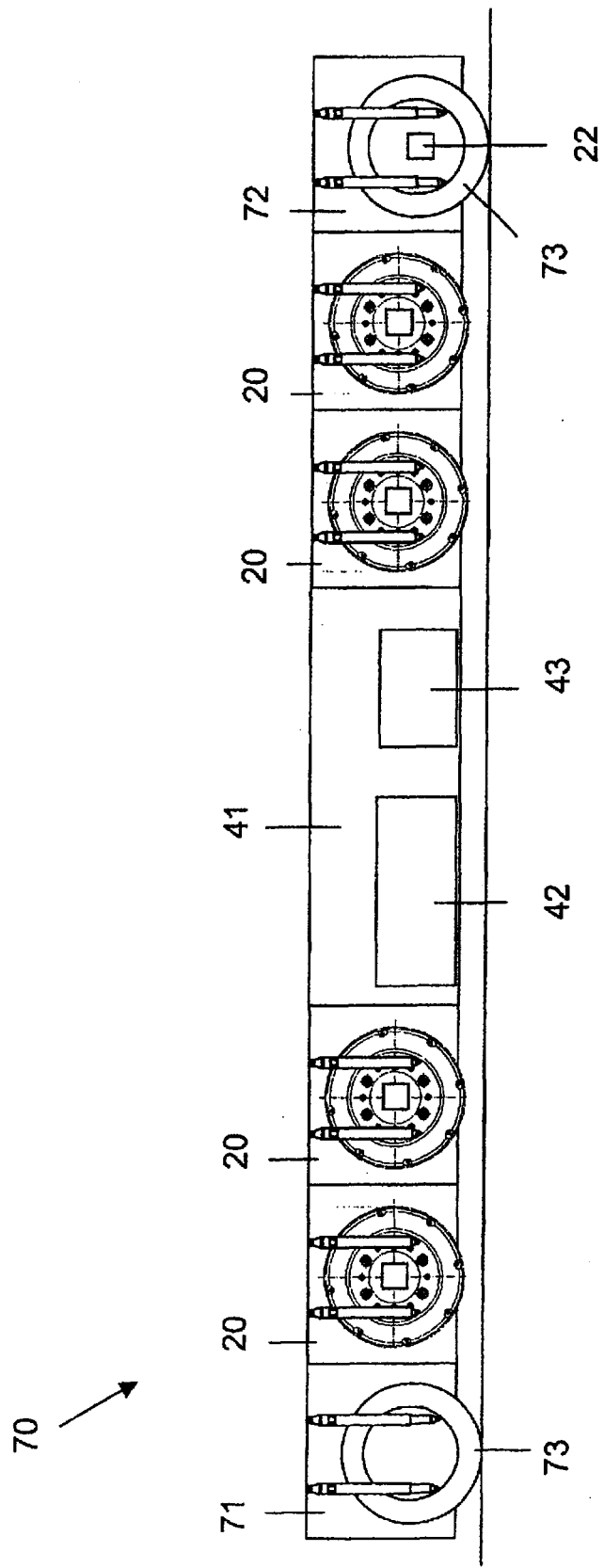
FIGS. 7 and 8 schematically illustrate a further omnidirectional vehicle in accordance with the present invention.
Figure 8:
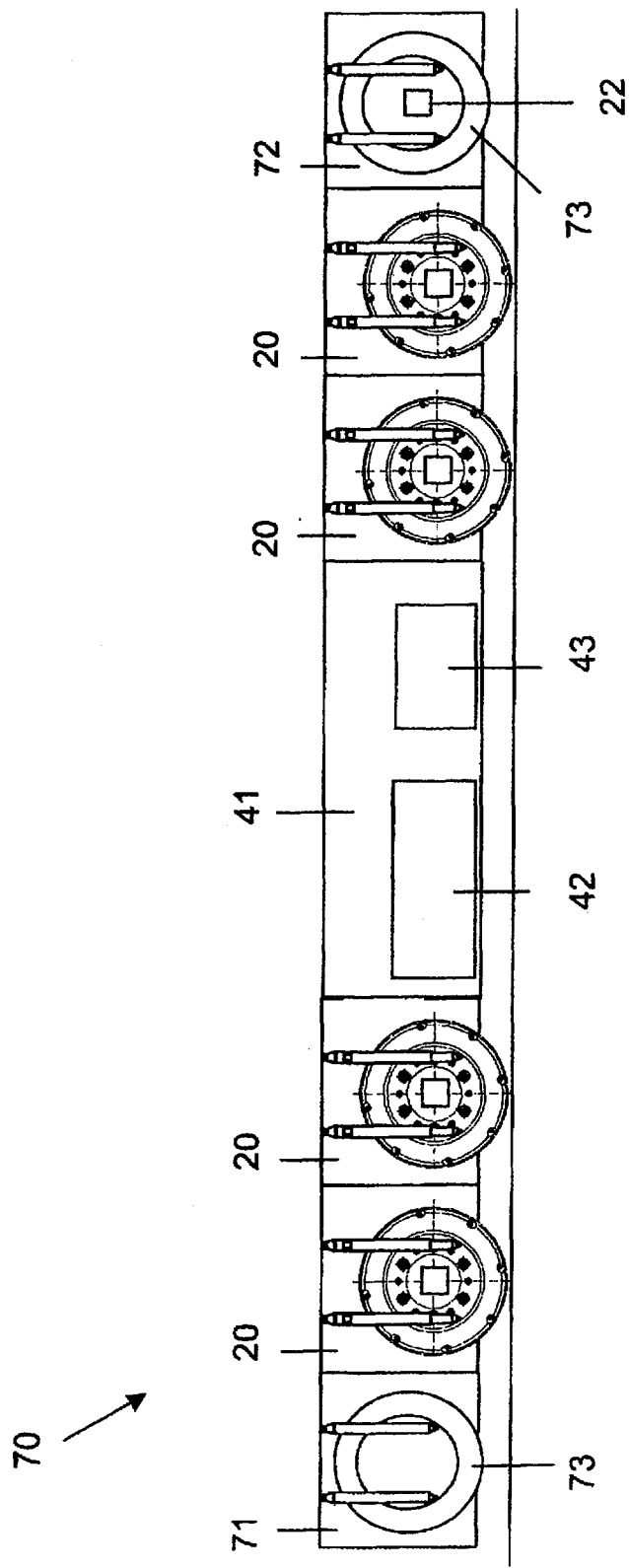

FIGS. 7 and 8 show an additional omnidirectional vehicle 70 that, in the exemplary embodiment, has eight driving modules 20, a bearing module 41, two driving modules 71 and two driving modules 72. The driving modules 20 are omnidirectional driving modules 20 as described in the preceding and shown in FIGS. 2 and 3. The driving modules 71, 72 differ from the omnidirectional driving modules in that these do not possess omnidirectional wheels 1 but rather standard wheels 73. In the case of the present exemplary embodiment, the standard wheels 73 are solid rubber wheels that are attached to their module bodies 21 by means of vibration dampers 23.

In the exemplary embodiment, the module bodies 21 of the omnidirectional driving modules 20 and of the driving modules 71, 72 with the standard wheels 73 are essentially identical in construction. Moreover, the standard wheels 73 have the same diameter as the omnidirectional wheels 1 and can be retracted and extended by means of the vibration dampers 23. For this the linear actuators 26 of these vibration dampers 23 are likewise connected (not shown) with the control device 43 and the battery 42.

In the exemplary embodiment, each driving module 72 with the standard wheels 73 has an electrical actuator 22 that is comparable to the electrical actuators of the omnidirectional driving modules 20. In contrast to this, the driving modules 71 with the standard wheels 73 do not have any electrical actuators but are steerable. It is thus possible for the vehicle 70 in the operating state shown in FIG. 7 to be operated with retracted omnidirectional wheels 1 but with extended standard wheels 73 and can also be steered in this operating state. The steerable driving modules 71 however, may also have an electrical actuator. Alternatively, the standard wheels 73 can be driven by hydraulic actuators.

FIG. 8 shows the vehicle 70 in a second operating state in which the standard wheels 73 of the driving modules 71, 72 are retracted; in contrast, the omnidirectional wheels 1 of the omnidirectional driving modules 20 are extended. In this operating state, the vehicle 70 functions as an omnidirectional vehicle.

Figure 9:
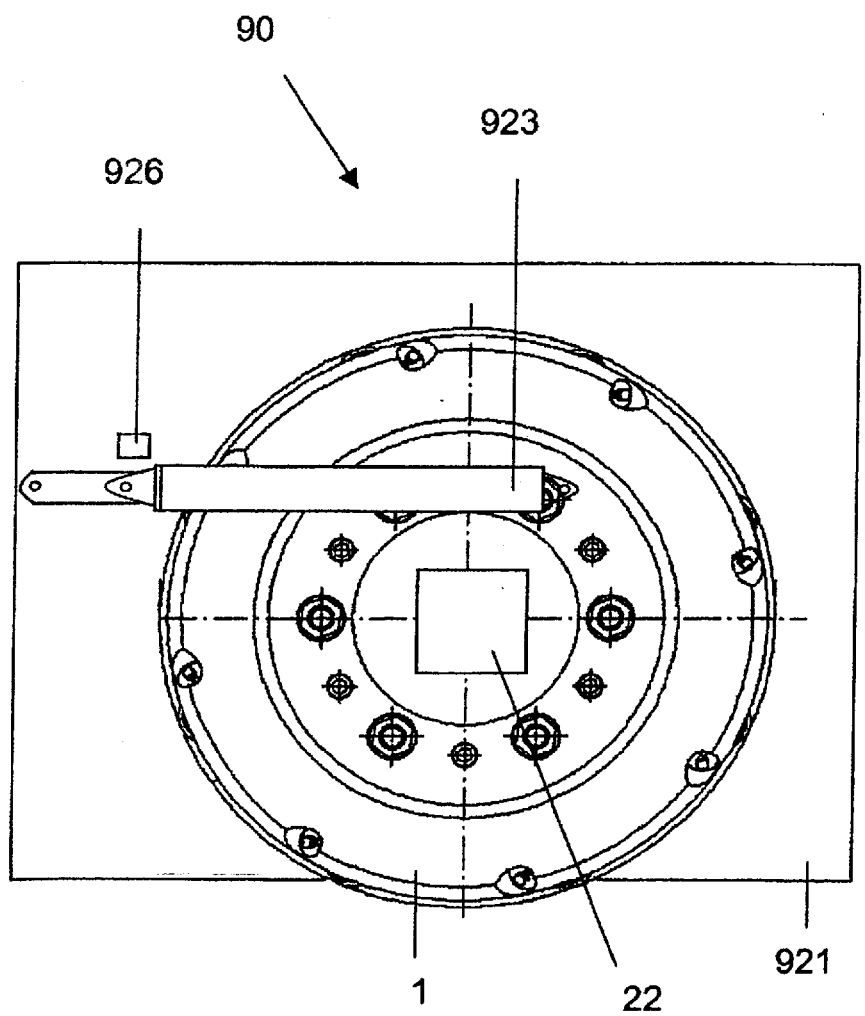
FIGS. 9 and 10 schematically illustrate an additional driving module with an omnidirectional wheel in accordance with the present invention, respectively in two different operating states.
Figure 10:
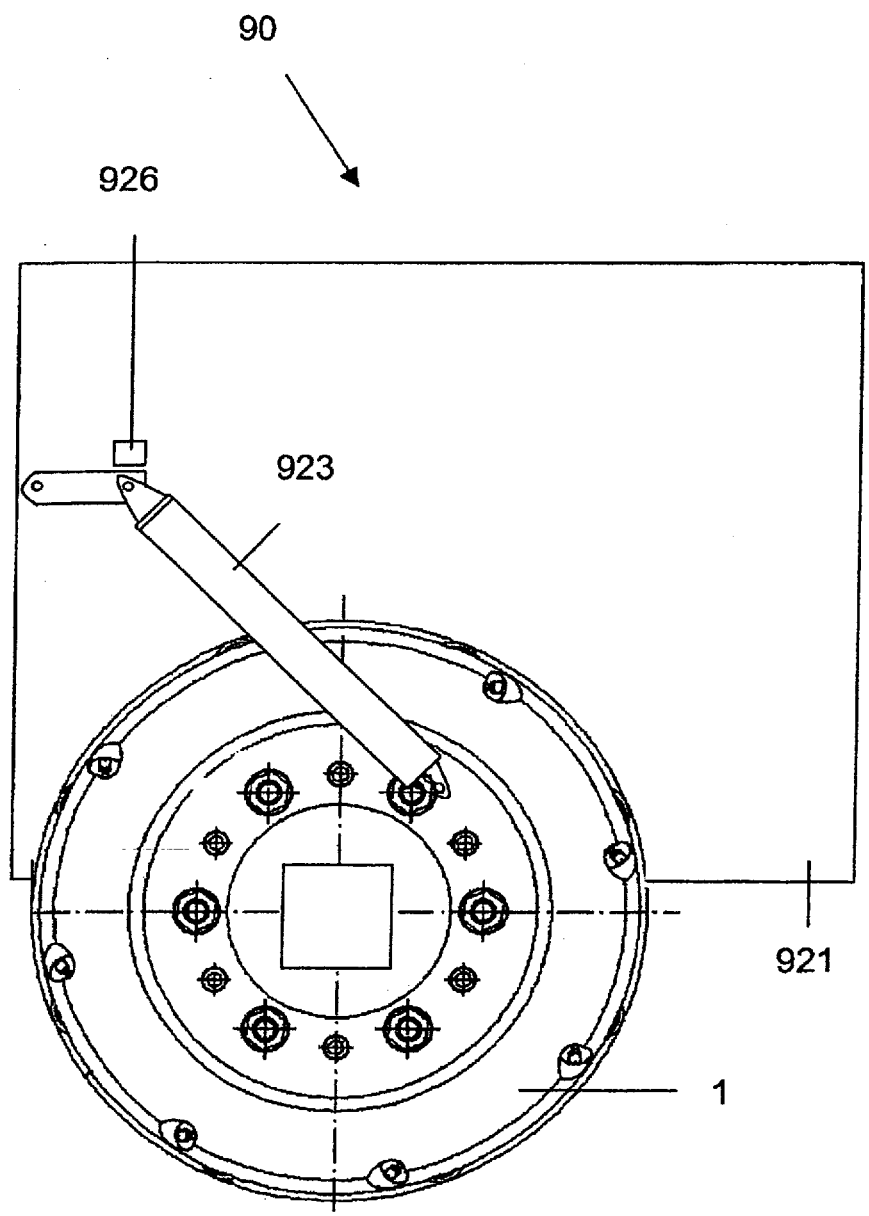

FIGS. 9 and 10 show a further embodiment of an omnidirectional driving module 90. To the extent that nothing to the contrary is described in the following, components of the omnidirectional driving module 90 shown in FIGS. 9 and 10 and that are largely structurally and functionally identical to components of the omnidirectional driving module 20 presented in FIGS. 2 and 3 are provided with the same reference characters.

The omnidirectional driving module 90 of FIGS. 9 and 10 differs significantly from the omnidirectional driving module 1 shown in FIGS. 2 and 3 due to its single wheel suspension of the wheel 1 at the module body 921 of the driving module 100.

In the exemplary embodiment shown in FIGS. 8 and 9, the single wheel suspension for the wheel 1 has a vibration damper 923 that here does not have an outer tube and an inner tube that can be extended by means of a linear actuator. Rather, one of the ends of the vibration damper 923 is borne at the module body 921 such that it can pivot, and the other end is attached to the wheel 1 so that the wheel 1 can be pivoted into the module body 921 and can be pivoted at least partially out of the module body 921, for example by an electromotor 926.

The operating state in which the wheel 1 is pivoted at least for the most part into the module body 921 is shown in FIG. 9. FIG. 10 shows the wheel 1 at least partially pivoted out from the module body 921.

The omnidirectional driving module 90 can be used for the vehicles 40, 70 instead of the driving modules 20.

Figure 11:
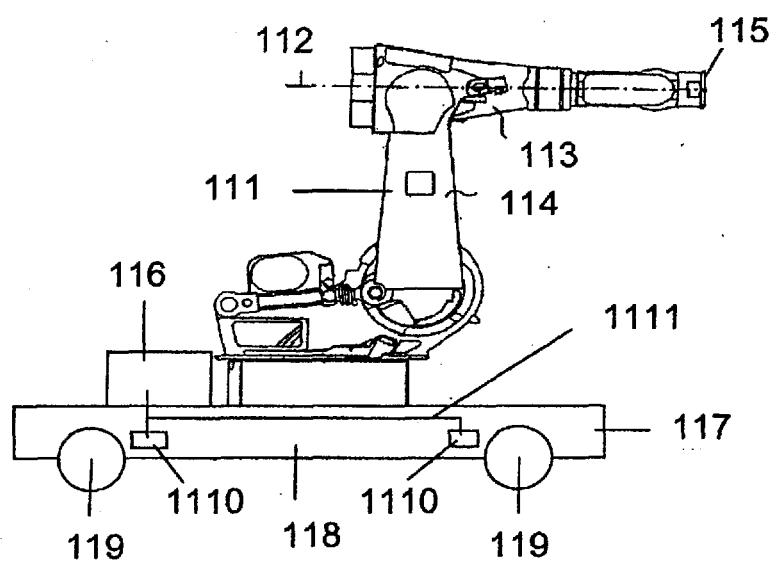
FIG. 11 schematically illustrates an industrial robot attached to an omnidirectional bearing vehicle in accordance with the present invention.

FIG. 11 shows an industrial robot 111 with kinematics for movements in, for example, six degrees of freedom. The industrial robot 11 has (in a generally known manner) six movement axes, articulations, levers 113, 114 and a flange 115. Only one of the movement axles in FIG. 11 is provided with a reference character 112.

Each of the movement axles 112 is moved by an actuator (not shown in detail). For example, the actuators respectively comprise an electrical motor as this is generally known to the man skilled in the art.

The industrial robot 111 also has a control computer 116 that is connected (not shown) with the actuators of the industrial robot 111 and controls this in a generally known manner by means of a computer program running on the control computer 116 so that the flange 115 of the industrial robot 111 implements a predetermined movement.

FIG. 11 also shows an omnidirectional vehicle 117 with a base body 118 and, in the exemplary embodiment, with four omnidirectional wheels 119, of which two of the wheels 119 are shown in FIG. 11. The omnidirectional wheels 119 are executed, for example, like the Mecanum wheel 1 of FIG. 1 with a single wheel suspension.

The industrial robot 111 is attached to the base body 118 of the omnidirectional vehicle 119 so that this industrial robot 111 can be moved with the omnidirectional vehicle 117. However, the omnidirectional vehicle 117 can also be executed in a modular manner, similar to the omnidirectional vehicles 40, 70 shown in FIGS. 4 through 8.

The omnidirectional wheels 119 are respectively driven by an actuator 1110 that, for example, has an electrical motor and a transmission in a generally known manner. The electrical actuators 1110 of the omnidirectional vehicle 117 are also connected via electrical conductors 1111 with the control computer 116 of the industrial robot 111 that thus also additionally activates the actuators 1110 of the omnidirectional vehicle 117 so that the industrial robot 111 moves in a targeted manner by means of the omnidirectional vehicle 117 due to the computer program running on the control computer 116.

Although modifications and changes may be suggested by those skilled in the art, it is the intention of the inventors to embody within the patent warranted heron all changes and modifications as reasonably and properly come within the scope of their contribution to the art.

We claim as our invention:

1. An omnidirectional vehicle, comprising:
   a vehicle body;
   at least four Mecanum wheels;
   at least four single wheel suspensions to which said at least four Mecanum wheels are respectively, individually mounted, each of said at least four single wheel suspensions being connected to said vehicle body, each single wheel suspension being configured to allow the respective Mecanum wheel mounted thereto to be retracted into the vehicle body or to extend at least partially out from the vehicle body; and
   a height actuator in each of said single wheel suspensions that individually, selectively sets and maintains a height of the respective Mecanum wheel mounted thereto relative to said vehicle body, causing said vehicle body to traverse an uneven terrain with substantially no tilting of said vehicle body.

2. Vehicle according to claim 1 wherein each of said single wheel suspension comprises a damping that at least partially cushions the respective Mecanum wheel mounted thereto during operation of the vehicle.

3. Vehicle according to claim 1 comprising a lifting device and at least one clearance sensor configured for level regulation by adjusting said height of the Mecanum wheel relative to said vehicle body.

4. Vehicle according to claim 1 wherein each of said single wheel suspension comprises a vibration damper.

5. Vehicle according to claim 1 wherein at least some of the individual Mecanum wheels comprise at least one of a drive actuator.

6. Vehicle according to claim 1 comprising at least one standard wheel arranged to rotate by a further single wheel suspension connected to the vehicle body.

7. Vehicle according to claim 6, wherein the further single wheel suspension of the standard wheel has a structure essentially the same as the respective single wheel suspensions of the omnidirectional wheels.

8. Vehicle according to claim 1 comprising multiple standard wheels each with a further single wheel suspension.

9. Vehicle according to claim 1 wherein the vehicle body comprises multiple driving modules, each driving module comprising:
   a module body,
   one of said omnidirectional wheels, and
   one of said single wheel suspensions attached to the module body.

10. Vehicle according to claim 9, wherein at least one of the first module bodies comprises at least one of a drive actuator for driving of, or a brake for braking of, the respective omnidirectional wheel thereof.

11. Vehicle according to claim 9 wherein the driving modules can be assembled so as to be separable or inseparable.

12. Vehicle according to claim 1 wherein said at least one of said Mecanum wheels connected to the vehicle body by one of said single wheel suspensions comprises a drive actuator that drives said at least one of the Mecanum wheels.

13. Vehicle as claimed in claim 12 comprising:
an industrial robot mounted on said vehicle body, said industrial robot comprising multiple robotic axles and a control computer configured to provide control signals that manipulate said industrial robot by moving said robotic axles, and said control computer being configured to also operate said drive actuator to control movement of said at least one of the Mecanum wheels.

14. An omnidirectional vehicle comprising:
a plurality of first driving modules and at least one second module, interconnected together to form a vehicle body;
each of said plurality of driving modules comprising one Mecanum wheel mounted in said driving module by a single wheel suspension, each of said single wheel suspension being configured to allow the respective Mecanum wheel mounted thereto to be retracted into the vehicle body or to extend at least partially out from the vehicle body, and each of said single wheel suspension comprising a single wheel suspension height actuator that selectively, individually sets and maintains a height of the Mecanum wheel mounted thereto relative to said vehicle body;
said at least one second module comprising a standard, non-omnidirectional wheel and a further single wheel suspension to which said standard wheel is mounted, said further single wheel suspension attaching said single wheel to said at least one second module body, said further single wheel suspension being substantially the same as said plurality of single wheel suspensions to which the omnidirectional wheels are respectively mounted, and said standard wheel thereby also being individually and selectively height adjustable relative to said vehicle body to selectively set said vehicle body for operation on a terrain in a first mode with only said Mecanum wheels in contact with said terrain or in a second mode with only said standard wheel in contact with, said terrain; and
said at least one second module comprising at least one module actuator selected from the group consisting of a module drive that drives said standard wheel and a module brake that brakes said standard wheel.

* * * * *